(12) United States Patent
Killich

(10) Patent No.: US 11,248,956 B2
(45) Date of Patent: Feb. 15, 2022

(54) OPTICAL ARRANGEMENT FOR THE COMPENSATION OF INCORRECT ALIGNMENTS OF A REFLECTOR IN RELATION TO A LIGHT SOURCE

(71) Applicant: Mettler-Toledo GmbH, Greifensee (DE)

(72) Inventor: Frank Killich, Bad-Zwesten (DE)

(73) Assignee: METTLER-TOLEDO GMBH, Greifensee (CH)

( * ) Notice: Subject to any disclaimer, the term of this patent is extended or adjusted under 35 U.S.C. 154(b) by 519 days.

(21) Appl. No.: 16/318,038

(22) PCT Filed: Jul. 13, 2017

(86) PCT No.: PCT/EP2017/067722
§ 371 (c)(1),
(2) Date: Jan. 15, 2019

(87) PCT Pub. No.: WO2018/011350
PCT Pub. Date: Jan. 18, 2018

(65) Prior Publication Data
US 2021/0278276 A1    Sep. 9, 2021

(30) Foreign Application Priority Data
Jul. 15, 2016  (DE) ............... 10 2016 113 049.4

(51) Int. Cl.
*G01J 3/26*  (2006.01)
*G01J 3/453*  (2006.01)
(Continued)

(52) U.S. Cl.
CPC ............. *G01J 3/26* (2013.01); *G01J 3/4532* (2013.01); *H01S 3/0813* (2013.01); *H01S 3/08059* (2013.01); *G01J 2003/423* (2013.01)

(58) Field of Classification Search
None
See application file for complete search history.

(56) References Cited

U.S. PATENT DOCUMENTS

| 4,383,762 A | 5/1983 | Burkert |
| 4,544,272 A | 10/1985 | Doyle |

(Continued)

FOREIGN PATENT DOCUMENTS

| DE | 4004071 A1 | 8/1991 |
| DE | 102007010841 A1 | 9/2008 |

(Continued)

OTHER PUBLICATIONS

International Preliminary Report on Patentability and Written Opinion of the International Searching Authority (Forms PCT/IB/326, PCT/IB/373, PCT/ISA/237 and PCT/IB/338) dated Jan. 24, 2019, by the International Bureau of WIPO, in corresponding International Application No. PCT/EP2017/067722, with English Translation. (16 pages).

(Continued)

*Primary Examiner* — Shawn Decenzo
(74) *Attorney, Agent, or Firm* — Buchanan Ingersoll & Rooney PC

(57) ABSTRACT

An optical arrangement has a light source, which emits a light beam along a first optical axis. A first reflector is provided, and a second reflector reflects light reflected by the first reflector. The first reflector has a transverse offset from the first optical axis to reflect light along a second optical axis which has a parallel offset of two times the transverse offset of the first optical axis. The second reflector reflects the light beam back to the first reflector along a third optical axis having a parallel offset with a fixed amount in a fixed transverse direction in relation to the second optical axis. The light beam is reflected by the first reflector along a fourth optical axis which has a parallel offset in relation to (Continued)

the first optical axis with a fixed amount counter to the fixed transverse direction.

16 Claims, 17 Drawing Sheets

(51) Int. Cl.
*H01S 3/08* (2006.01)
*H01S 3/081* (2006.01)
*G01J 3/42* (2006.01)

(56) References Cited

U.S. PATENT DOCUMENTS

| | | | | |
|---|---|---|---|---|
| 5,148,443 | A * | 9/1992 | Du | H01S 3/081 372/107 |
| 5,220,463 | A * | 6/1993 | Edelstein | G01J 11/00 359/857 |
| 5,251,221 | A * | 10/1993 | Stultz | H01S 3/305 372/3 |
| 5,923,695 | A * | 7/1999 | Patel | H01S 3/02 372/75 |
| 6,373,866 | B1 * | 4/2002 | Black | H01S 3/0606 372/100 |
| 9,212,990 | B1 | 12/2015 | Muraviev | |
| 2003/0223076 | A1 | 12/2003 | Hidaka et al. | |
| 2006/0181710 | A1 * | 8/2006 | Kachanov | G01N 21/39 356/437 |
| 2007/0097378 | A1 * | 5/2007 | Kauppinen | G01J 3/4532 356/498 |
| 2009/0109442 | A1 * | 4/2009 | Felix | G01B 9/02018 356/491 |
| 2011/0075687 | A1 * | 3/2011 | Gokay | H01S 3/09415 372/10 |
| 2012/0103099 | A1 * | 5/2012 | Stuke | B82Y 30/00 73/657 |
| 2014/0291526 | A1 | 10/2014 | Killich | |
| 2015/0226665 | A1 * | 8/2015 | Weidmann | G01J 3/42 356/437 |

FOREIGN PATENT DOCUMENTS

| | | |
|---|---|---|
| EP | 2 604 999 A1 | 6/2013 |
| JP | 2000252573 A | 9/2000 |
| JP | 2003-247804 A | 9/2003 |
| WO | 98/57400 A1 | 12/1998 |

OTHER PUBLICATIONS

International Search Report (PCT/ISA/210) dated Sep. 28, 2017, by the European Patent Office as the International Searching Authority for International Application No. PCT/EP2017/067722.
Written Opinion (PCT/ISA/237) dated Sep. 28, 2017, by the European Patent Office as the International Searching Authority for International Application No. PCT/EP2017/067722.
Zhiguang, Xu et al., "Adjustment-free cat's eye cavity He-Ne laser and its outstanding stability", Optics Express, vol. 13, No. 14, pp. 5565-5573, Jul. 11, 2005.
Japanese Office Action dated Jul. 13, 2021 by the Japanese Patent Office for JP Application No. 2019501614, 9 pages (with English Translation).

* cited by examiner

OPTICAL ARRANGEMENT FOR THE COMPENSATION OF INCORRECT ALIGNMENTS OF A REFLECTOR IN RELATION TO A LIGHT SOURCE

TECHNICAL FIELD OF THE INVENTION

The invention relates to an optical arrangement having a light source, which emits a light beam in the direction of an optical axis, wherein the optical axis is defined in relation to a mechanical structure of the light source, having a first reflector for the light beam arranged at a distance from the light source and a second reflector for the light beam reflected by the first reflector.

The optical arrangement can be part of a LASER resonator. It can also form part of a LASER interferometer or of a LASER spectrometer.

BACKGROUND ART

When a LASER resonator is designed with a large optical distance between reflectors delimiting the LASER resonator in order to achieve a desired beam quality, one of the challenges is to stabilize the reflectors in terms of their orientation in such a way that the LASER beam reflected by them is reflected onto itself. In many cases, there are no rigid mechanical structures to which the reflectors arranged at a distance from a light source comprising a LASER material can be fastened with sufficient rigidity in terms of their position and orientation. With LASER interferometers, a similar problem arises, which is further amplified if a reflector which should reflect the LASER beam back onto itself is movable in the direction of a LASER beam and accordingly cannot be fastened rigidly to a mechanical structure. LASER spectrometers in which a reflector is arranged on a side of a measuring section also require a stable orientation of the reflector in such a way that the reflected LASER beam maintains a desired direction, for example, towards a detector.

Retroreflectors reflect incident light in principle back to the respective light source. However, when a triple prism as retroreflector reflects an incident LASER beam, the reflected LASER beam has a parallel offset from the incident LASER beam. Here, the amount of the parallel offset depends on a transverse offset between a main axis of a triple prism with respect to the optical axis of the incident LASER light and on an angle between the main axis of the triple prism and the optical axis of the incident LASER beam. In a cat's eye used as a retroreflector, an additional angular error occurs between the incident LASER beam and the reflected LASER beam, if the main axis of the cat's eye is tilted in relation to the optical axis of the incident LASER beam.

From Zhiguang Xu et al.: Adjustment-free cat's eye cavity He—Ne laser and its outstanding stability, Optics Express, Vol. 13, No. 14, Jul. 11, 2005, pages 5565-5573, the use of a cat's eye as a reflector is known, which delimits a LASER cavity on one side.

From EP 2 604 999 A1, a gas measuring apparatus for absorption spectroscopic in-situ determination of at least one chemical and/or physical parameter of a gaseous measured medium is known. The gas measuring apparatus comprises a LASER as radiation source, a process window for coupling the radiation emitted by the LASER into a measured medium and at least one detector by means of which the radiation after the interaction with the measured medium is detected. The process window is designed as a meniscus lens which has a convex surface and a concave surface. Furthermore, a retroreflector is provided, which deflects the radiation coupled into the measured medium back to the process window. The retroreflector is designed as a cat's eye, a triple prism, a triple mirror or a planar mirror. The detector and the LASER can be arranged together on one side of the process window, wherein the retroreflector is arranged on the other side of the process window behind the measured medium. For the detector, a second process window with a second meniscus lens can also be provided. The retroreflector is arranged without seal, and the measured medium or a rinsing gas washes around it.

Position or direction changes of the retroreflector have an effect on the spatial orientation of the beam reflected back to the detector in relation to the spatial orientation of the beam emitted by the LASER.

From U.S. Pat. No. 4,383,762 A, a two-beam interferometer for Fourier spectroscopy with a rigid pendulum is known. On the rigid pendulum, a movable retroreflector in the form of an angle mirror is mounted. Due to the rigid pendulum, the ability of the retroreflector to move is limited to a plane. A light beam incident along a first optical axis is reflected by the retroreflector in the direction of a second optical axis which has a parallel offset from the first optical axis. On the second optical axis, an orthogonally oriented planar mirror is arranged, which reflects the light beam on the second optical axis back to the retroreflector on the pendulum. This pendulum then reflects the light beam a second time, in particular counter to its original direction of incidence again on the first optical axis.

Objective of the Invention

The underlying objective of the invention is to provide an optical arrangement wherein the position and preferably also the orientation of a reflector that is arranged at a distance from the light source and reflects a light beam originating from the light source have no effect on the position of the optical axis of a light beam originating from the optical arrangement.

Solution

The objective of the invention is achieved by an optical arrangement according to the disclosed embodiments. Applications of the optical arrangement according to the invention can relate to a LASER resonator, a LASER interferometer and a LASER spectrometer.

DESCRIPTION OF THE INVENTION

In an optical arrangement according to the invention having a light source, which emits a light beam in the direction of an optical axis, wherein a spatial orientation of the optical axis is defined in relation to a mechanical structure of the light source, having a first reflector that is arranged at a distance from the light source and a second reflector for the light beam reflected by the first reflector, the first reflector is a retroreflector which is arranged with a transverse offset from the first optical axis in such a way that it reflects the light beam in the direction of a second optical axis which has a parallel offset of two times the transverse offset in relation to the first optical axis in the transverse direction of the transverse offset. The second reflector is fastened to the mechanical structure of the light source and reflects the light beam reflected by the first reflector in the direction of a third optical axis back to the first reflector, wherein the third optical axis has a parallel offset with a fixed amount in a fixed transverse direction in relation to the second optical axis. Thereby, the light beam is reflected by the first reflector in the direction of a fourth optical axis which has a parallel offset with a fixed amount counter to the fixed transverse direction in relation to the first optical axis.

In the invention, the first reflector is a retroreflector which has transverse offset from the first optical axis of the light beam to be emitted by the light source. Here, the fact that the retroreflector does not reflect the light beam onto itself but with a parallel offset between the second optical axis of the reflected light beam in relation to the first optical axis of the light beam emitted by the light source is not only assumed but exploited in a targeted manner in order to reflect the light beam to the second reflector fastened to the mechanical structure of the light source, the orientation of said second reflector being defined thus with respect to the first optical axis.

The second reflector is designed in such a way that it reflects the light beam reflected by the first reflector in the direction of the third optical axis which has a parallel offset from the second optical axis with the fixed amount in the fixed transverse direction back to the first reflector. This is a known property of certain reflectors which, for that purpose, have to be oriented in a defined manner with respect to the first optical axis in such a way that they also have this orientation with respect to the second optical axis. In the invention, the light beam reflected back to the retroreflector by the second reflector is not reflected by the retroreflector in the direction of the first optical axis towards the light source but in the direction of the fourth axis which has a parallel offset from the first optical axis with the fixed amount counter to the fixed transverse direction, wherein the fixed amount and the transverse direction are predetermined by the second reflector and its fastening to the mechanical structure of the light source. Thereby, the spatial orientation of the fourth optical axis with respect to the first optical axis is completely predetermined by the second reflector and its fastening to the mechanical structure of the light source.

The direction in which the retroreflector reflects the light beam reflected by the second reflector is independent of how large the distance of the retroreflector from the light source and how large the transverse offset of the retroreflector from the first optical axis is. This is true even when the retroreflector is a cat's eye.

In the practical implementation of the present invention, the theoretical case, which is to be avoided, does not apply, namely the case in which the fixed amount and the fixed transverse direction of the parallel offset between the second and the third optical axis introduced by the second reflector just compensates for the parallel offset between the first and the second optical axis introduced by the retroreflector, which would result in the first and the third optical axis coinciding. However, in order to limit the necessary size, i.e., the effective cross-sectional surface of the retroreflector, it is preferable that the fixed amount and the fixed transverse direction of the parallel offset between the second and the third optical axis partially compensates for the parallel offset between the first and the second optical axis introduced by the retroreflector. In particular, an angle between the transverse offset of the retroreflector from the first optical axis and the parallel offset of the fourth optical axis with respect to the first optical axis resulting from the second reflector can be between 10° and 70° or between 20° and 50°. In addition, the fixed amount of the parallel offset can be 1 to 3 times or 1.5 to 2.5 times, i.e., approximately 2 times the transverse offset of the retroreflector multiplied by the cosine of this angle. It is understood that these indications relate in particular to a basic orientation of the retroreflector with respect to the first optical axis. However, these indications can also be complied with in the entire range of expected position changes of the retroreflector with respect to the first optical axis.

The second reflector can be a mirror arrangement or a prism arrangement having three planar surfaces reflecting the light beam, on which surfaces the light beam is reflected successively. Here, one of the planar surfaces can be oriented orthogonally in relation to the first optical axis, while the two other planar surfaces are arranged axially symmetrically in relation to a surface normal of one planar surface, and wherein the surface normals of all three planar surfaces fall in one plane. In this case, the light beam first strikes one of the other two planar surfaces, then one of the planar surfaces and lastly the other of the other two planar surfaces, where it is reflected. In another embodiment variant of the present invention, one of the three planar surfaces reflecting the light beam extends at an angle of 45° relative to the first optical axis in such a way that it deflects the light beam by 90°, and the other two planar surfaces deflect the light beam by two successive reflections by an additional 90°.

On the fourth optical axis, a third reflector can be arranged, which reflects the light beam reflected by the retroreflector back in the direction of the fourth optical axis and which is fastened to the mechanical structure of the light source. This third reflector can reflect the light beam back to the retroreflector in particular in the direction of the fourth optical axis and, for this purpose, it can be a planar mirror oriented orthogonally relative to the first optical axis. The light beam then travels back to the second reflector via the retroreflector and from there back to the retroreflector and finally back to the light source on the first optical axis. In this way, a folded LASER resonator can be formed, wherein the light source comprises pumped LASER material. The third reflector, just like the second reflector, can be fastened to the mechanical structure of the light source. Since, just like the second reflector, it is in general not arranged at a distance from the light source, this fastening presents no problems.

Instead of being designed as a planar mirror, the third reflector can also be designed as a convex mirror which is curved around a center on the fourth axis. Such a convex mirror is not uncommon as an end element of a LASER resonator, in order to limit beam divergence of the light beam, i.e., of the LASER beam in the LASER resonator.

The third reflector can also be designed like the second reflector, i.e., it can reflect the light beam in the direction of a fifth optical axis back to the first reflector, wherein the fifth optical axis has a parallel offset from the fourth optical axis with an additional fixed amount in an additional fixed transverse direction. Thereby, the light beam is reflected by the first reflector in the direction of a sixth optical axis which, in addition to the fixed amount counter to the fixed transverse direction, also has a parallel offset from the first optical axis with the additional fixed amount counter to the additional fixed transverse direction.

The first reflector of the optical arrangement according to the invention, i.e., the retroreflector, can in particular be or at least comprise a triple prism or a triple mirror. Such a triple prism or such a triple mirror as a retroreflector can also be tilted with its main axis relative to the first optical axis, without resulting in a position change of the light beam reflected for the second time by the retroreflector with respect to the first optical axis. The optical axis, in the direction of which the retroreflector reflects the light beam from the light source for the second time, is then uncoupled overall from the position and orientation of the retroreflector.

In an alternative embodiment of the inventive arrangement according to the invention, which differs from the embodiment of the optical arrangement according to the invention described here with regard to the renewed reflection of the LASER beam reflected by the second reflector, this renewed reflection does not occur by means of the first reflector but by an additional retroreflector coupled rigidly thereto. The rigid relative arrangement of the first reflector and of the additional reflector is here in particular such that the two retroreflectors have a fixed distance transverse to the third optical axis and that the fixed distance extends at a fixed angle or parallel to the first transverse direction between the second and the third optical axis. In triple prisms as retroreflectors, the relevant distance is the component of the distance between the apexes of the triple prisms which extends perpendicular to the third optical axis.

Even if the main axes of the two retroreflectors do not extend parallel to one another, in the alternative embodiment of the inventive optical device, the light beam is reflected by the retroreflector coupled to the first reflector in the direction of a fourth optical axis which has a parallel offset from the first optical axis with an additional fixed amount in the fixed transverse direction. Besides depending on the fixed amount of the parallel offset between the second and the third optical axis, the additional fixed amount depends on the fixed distance between the first reflector and the second reflector rigidly coupled thereto and also on any fixed angle present between the fixed distance and the fixed transverse direction. In particular, it is important that there be a difference between the fixed distance of the retroreflectors optionally multiplied by the cosine of any angle present between the fixed distance and the fixed transverse direction, and the fixed amount of the transverse offset between the second and the third optical axis. Without such a difference and without an angle between the fixed distance and the fixed transverse direction, the fixed amount and the additional fixed amount are identical, and the two transverse offsets extend in the same direction. With decreasing fixed distance, the additional fixed amount decreases, in particular by two times the difference with respect to the fixed amount. In the same way, the additional fixed amount increases with increasing fixed distance.

In this alternative embodiment of the inventive arrangement as well, the second reflector introduces the transverse offset with the non-zero fixed amount and it is consequently not a planar mirror. The first retroreflector and the second retroreflector are preferably both triple prisms or triple mirrors. Advantageously, they are of the same size. They can be of identical design. All the other features of the first described embodiment of the invention, in particular the design of the second retroreflector, can also be implemented in this alternative embodiment of the optical arrangement according to the invention.

As already indicated, the light source can comprise a pumped LASER material, and the light beam can accordingly be a LASER beam. In particular, the optical arrangement according to the invention can be part of a LASER with a LASER resonator, wherein the first reflector and the second reflector as well as optionally the retroreflector coupled to the first reflector are parts of the LASER resonator, and the LASER material of the lightsource is arranged in the LASER resonator.

Moreover, the optical arrangement according to the invention can be part of a LASER interferometer, wherein the light beam reflected by the first reflector and by the second reflector as well as optionally by the retroreflector coupled to the first reflector is superposed with a light beam coherent thereto, in the optical path of which exclusively optical elements fastened to the mechanical structure of the light source are arranged.

In addition, the optical arrangement according to the invention can be part of a LASER spectrometer, wherein the light source, the second reflector and a detector fastened to the mechanical structure of the light source are arranged on a first side, and the first reflector and optionally the retroreflector coupled to the first reflector are arranged on a second side of a measurement volume, which faces the first side in such a way that the light beam reflected by the first reflector and by the second reflector and optionally by the retroreflector coupled to the first reflector passes at least four times through the measurement volume, before it strikes the detector.

A LASER spectrometer differs from the gas measurement device known from EP 2 604 999 A1, having an optical arrangement and a detector,
wherein the optical arrangement comprises
a light source which comprises a LASER material and emits a light beam in the direction of a first optical axis, wherein the light beam is a LASER beam, and wherein a spatial orientation of the first optical axis in relation to a mechanical structure of the light source is defined, and a first reflector for the light beam that is arranged at a distance from the light source,
wherein the first reflector is a retroreflector which is arranged with a transverse offset from the first optical axis in such a way that it reflects the light beam in the direction of a second optical axis which has a parallel offset from the first optical axis in the transverse direction of the transverse offset,
wherein the detector is fastened to the mechanical structure of the light source, and
wherein the light source and the detector are arranged on a first side of a measurement volume, and the first reflector is arranged on a second side of the measurement volume, which faces the first side in such a way that the light beam reflected by the first reflector passes through the measurement volume, before it strikes the detector, in particular in
that a second reflector of the optical arrangement is fastened to the mechanical structure of the light source and reflects the light beam reflected by the first reflector in the direction of a third optical axis which has a parallel offset from the second optical axis with a fixed amount in a fixed transverse direction,
either back to the first reflector in such a way that the light beam is again reflected by the first reflector and this time in the direction of a fourth optical axis which has a parallel offset from the first optical axis with the fixed amount counter to the fixed transverse direction,
or to an additional retroreflector which is rigidly coupled to the first reflector and oriented in such a way that the light beam is reflected by the additional retroreflector in the direction of a fourth optical axis which has a parallel offset from the first optical axis with an additional fixed amount in the fixed transverse direction, in such a way that the light beam reflected by the first reflector and by the second reflector passes at least four times through the measurement volume, before it strikes the detector.

In all the above-mentioned uses of the optical arrangement according to the invention, the positional stability of the optical axis in the direction of which the retroreflector reflects the light beam for the second time turns out to be a great advantage in comparison to any position and orientation changes of the retroreflector.

The optical arrangement according to the invention can also be part of a distance measuring device, wherein the light source, the second reflector, and a detector fastened to the mechanical structure of the light source are arranged on one end of the distance to be measured, and the first reflector is arranged on the other end of the distance to be measured in such a way that the light beam reflected by the first reflector and by the second reflector covers the distance at least four times, before it strikes the detector. Thus, the travel path of the light beam is doubled in comparison to a single reflection of the light beam on the first reflector, which simplifies its practical measurement, and the light beam reliably strikes the detector, even in the case of position and orientation changes of the first reflector.

Advantageous developments of the invention result from the claims, the description and the drawings. The advantages of features and of combinations of several features, which are mentioned in the description, are merely examples and can be effective alternatively or cumulatively, without the advantages necessarily having to be achieved by inventive embodiments. Without the subject matter of the added claims being modified thereby, the following holds with regard to the disclosure content of the original application documents and of the patent: additional features can be obtained from the drawings—in particular the represented geometries and the relative dimensions of several components with respect to one another as well as their relative arrangement and operative connection. The combination of features of different embodiments of the invention or of features of different claims is also possible in deviation from the selected references of the claims and is suggested hereby. This also relates to features represented in separate drawings or in their description. These features can also be combined with features of different claims. In the same way, features mentioned in the claims can be omitted for additional embodiments of the invention.

In terms of number of features, it should be understood that, for features mentioned in the claims and in the description, exactly this number is present or a larger number than the number mentioned is present, without the need for an explicit use of the adverbial expression "at least." Thus, for example, when a prism is mentioned, this should be understood to mean that exactly one prism is present or two prisms or more prisms are present. The features mentioned in the claims can also be completed by other features or they can be the only features that the respective product exhibits.

The reference signs contained in the claims do not represent a restriction of the scope of the subject matters protected by the claims. They are used only for the purpose of making the claims easier to understand.

BRIEF DESCRIPTION OF THE DRAWINGS

Below, the invention is explained in greater detail and described in reference to preferred embodiment examples represented in the figures.

DESCRIPTION OF EMBODIMENTS

Figure 1:
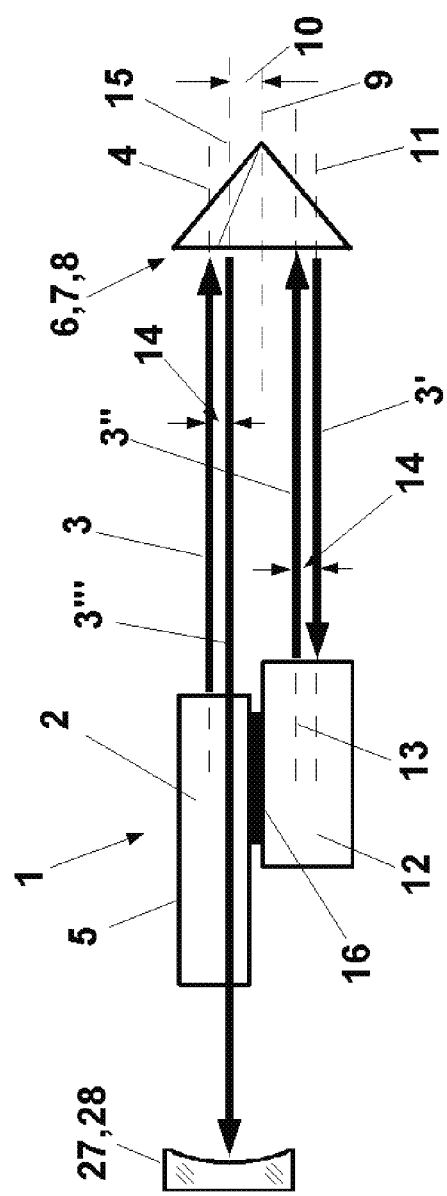
FIG. 1 is a first side view of an embodiment of the optical arrangement according to the invention.
Figure 2:
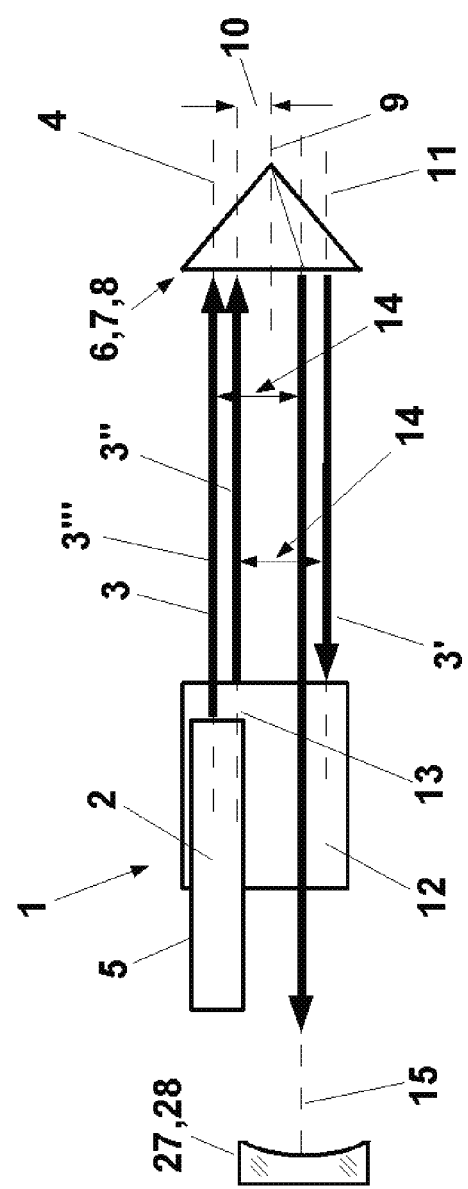
FIG. 2 is a second side view of the optical arrangement in the embodiment according to FIG. 1 in a viewing direction perpendicular to the viewing direction of FIG. 1.
Figure 3:
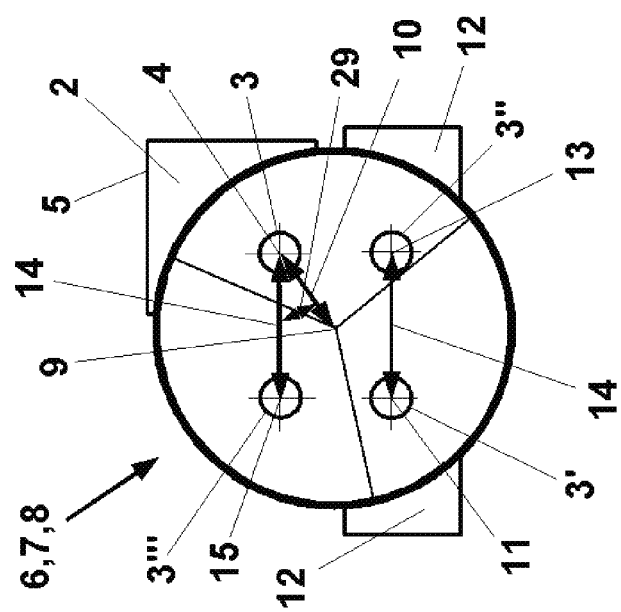
FIG. 3 shows a view of the embodiment of the optical arrangement according to FIGS. 1 and 2 with axial viewing direction perpendicular to the viewing directions of FIGS. 1 and 2.

The optical arrangement 1 represented in FIGS. 1 to 3 comprises a light source 2 which emits a light beam 3 in the direction of a first optical axis 4. Here, there is a fixed spatial orientation of the first optical axis 4 in relation to a mechanical structure 5 of the light source 2. Furthermore, the optical arrangement 1 comprises a first reflector 6 in the form of a retroreflector 7. Concretely, the retroreflector 7 is designed as a triple prism 8 here. The retroreflector 7 is arranged with transverse offset from the first optical axis 4 with an amount 10 with respect to its main axis 9. The retroreflector 7 reflects the light beam 3 in the direction of a second optical axis 11 which has a parallel offset from the first optical axis 4 in transverse direction with the double amount 10. The light beam 3 reflected by the retroreflector 7 is provided with the reference sign 3' in the figures. The reflected light beam 3' strikes a second reflector 12 of the optical arrangement 1. The second reflector 12 is designed in such a way that it reflects the reflected light beam 3' on its side in the direction of a third optical axis 13 which has a parallel offset from the second optical axis 11 with a fixed amount 14 in a fixed transverse direction. In the two figures, FIGS. 1 and 2, the fixed amount 14 only appears to be of different size because it extends in the fixed transverse direction at different angles relative to the viewing directions of FIGS. 1 and 2. The light beam 3 reflected by the reflector 12 is provided with the reference sign 3" in the figures. On the optical axis 13, the reflected light beam 3" again reaches the retroreflector 7, by which it is reflected in the direction of a fourth optical axis

15. The fourth optical axis 15 has a parallel offset from the first optical axis 4 with the same fixed amount 14 as the third optical axis 13 from the second optical axis 11 but counter to the fixed transverse direction. The light beam 3 which is reflected again by the retroreflector 7 along the optical axis 15 is provided with the reference sign 3′″ in the figures.

The fixed positional relation of the fourth optical axis 15 relative to the first optical axis 4 is based only on a fixed orientation of the second reflector 12 with respect to the mechanical structure 5 of the light source 2. A fixed position or orientation of the first reflector 6 with respect to the light source 2 is not a prerequisite for this. This will be explained in greater detail below in reference to FIGS. 8 to 10. The fixed orientation of the second reflector 12 with respect to the mechanical structure 5 of the light source 2 is achieved by a fastening 16 of the second reflector 12 to the mechanical structure 5, wherein the fastening does not have to be invariably rigid. Instead, setting devices can be present here, in order to orient the reflector 12 as desired with respect to the first optical axis 4. In addition, depending on the embodiment of the reflector 12, certain position and orientation changes of the reflector 12 with respect to the mechanical structure 5 are irrelevant, namely if they have no effect on the transverse offset between the optical axes 11 and 13 not only with regard to its fixed amount 14 but also with regard to its direction transverse to the optical axis 11.

In order to limit the necessary size of the retroreflector 7 in such a way that the light beam 3″ reflected by the second reflector 12 strikes the retroreflector 7 again, the parallel offset between the second optical axis 11 and the third optical axis 13, which is introduced by the second reflector, is folded by the fixed amount 14, and the parallel offset between the first optical axis 4 and the second optical axis 11, which is introduced by the retroreflector 7, is folded by the double amount 10 in such a way that they do not compensate for one another completely but partially. An angle 29 between the transverse offset of the retroreflector 7 from the first optical axis 4 by the amount 10, and the parallel offset, resulting from the second reflector 12, of the fourth optical axis 15 from the first optical axis 4 with the fixed amount 14 is acute and approximately 30° here. The fixed amount 14 of the parallel offset of the fourth optical axis 15 from the first optical axis 4 here is approximately 2 times the amount 10 of the transverse offset of the retroreflector multiplied by the cosine of the angle 29. Thus, in FIG. 3, the first optical axis 4 is located at a certain vertical distance above the third optical axis 13, and the fourth optical axis 15 is arranged at the same vertical distance above the second optical axis 11.

As indicated in FIGS. 1 and 2, on the fourth optical axis 15, a third reflector 27, for example in the form of a convex mirror 28, can be arranged, which is curved around a point on the fourth optical axis 15 and which limits, for example, a LASER resonator on one side, wherein LASER material is pumped in the light source 2. Here, the third reflector 27 can also be fastened in another way than indicated in FIGS. 1 and 2 to the mechanical structure 5 of the light source 2.

Figure 4:
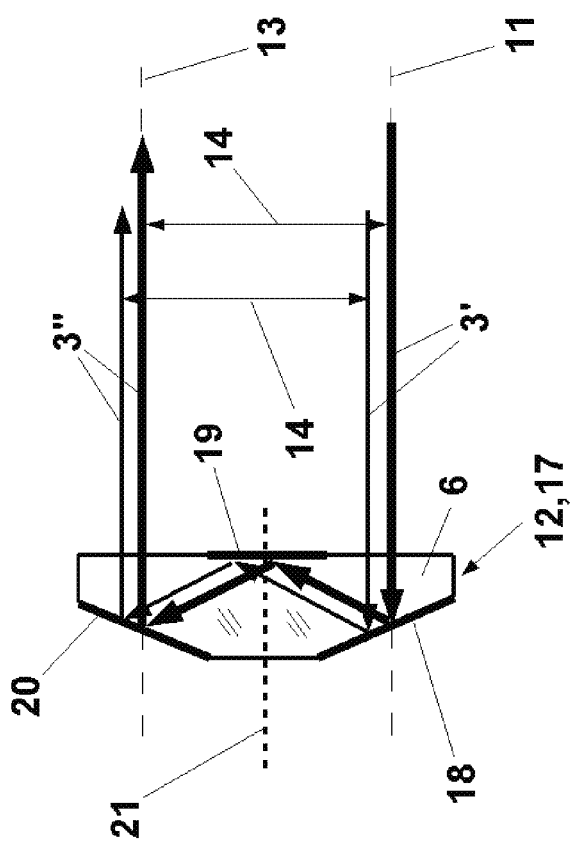
FIG. 4 shows a second reflector of an optical arrangement according to FIGS. 1 to 3 in a first embodiment.

FIG. 4 illustrates a first embodiment of the second optical reflector 12 in the form of a prism 17 with three planar surfaces 18, 19 and 20 reflecting the light beam 3. Here, one plane 19 is oriented orthogonally relative to the optical axes 11 and 13, and the other two planar surfaces 18 and 20 are arranged axially symmetrical relative to a surface normal 21 of the planar surface 19, wherein surface normals of all three planar surfaces 18 to 20 fall in the plane of the drawing of FIG. 4. Thereby, the light beam 3″ reflected by the reflector 12 in the direction of the third optical axis 13 has a parallel offset from to the light beam 3′ incident in the direction of the second optical axis 11 that is always in the same transverse direction with the same fixed amount 14. FIG. 4 indicates with a weaker line an upward displacement of the light beam 3′. This results in an upward displacement of the reflected light beam 3″ with the same amount. In the case of a displacement of the light beam 3′ in the viewing direction of FIG. 4, the light beam 3″ reflected by the reflector 12 also is displaced in exactly the same direction.

Figure 5:
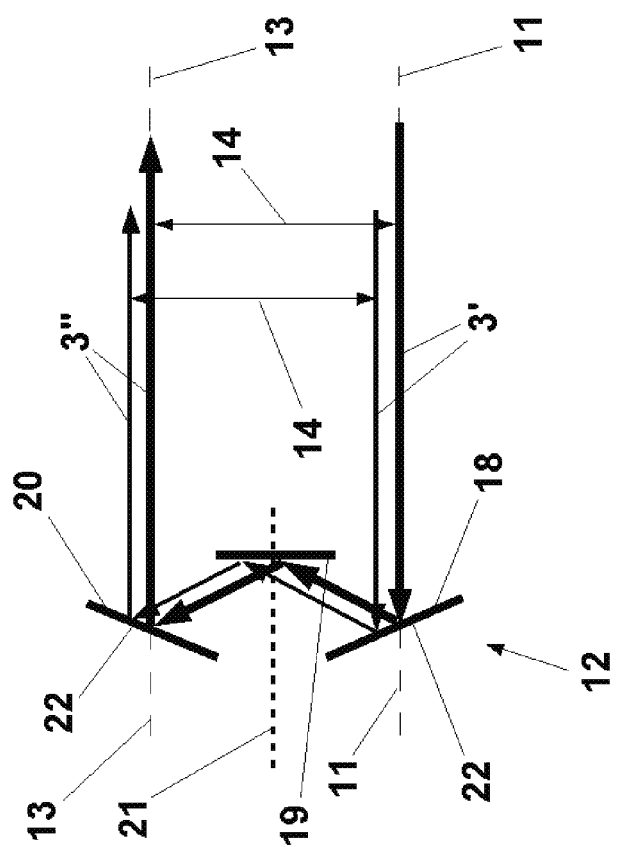
FIG. 5 shows the second reflector in a second embodiment which is equally effective as the embodiment according to FIG. 4.

FIG. 5 shows a reflector 12 equivalent to the reflector 12 according to FIG. 4, in which the planar surfaces 18 to 20 reflecting the light beam 3 are formed on three planar mirrors 22.

Figure 6:
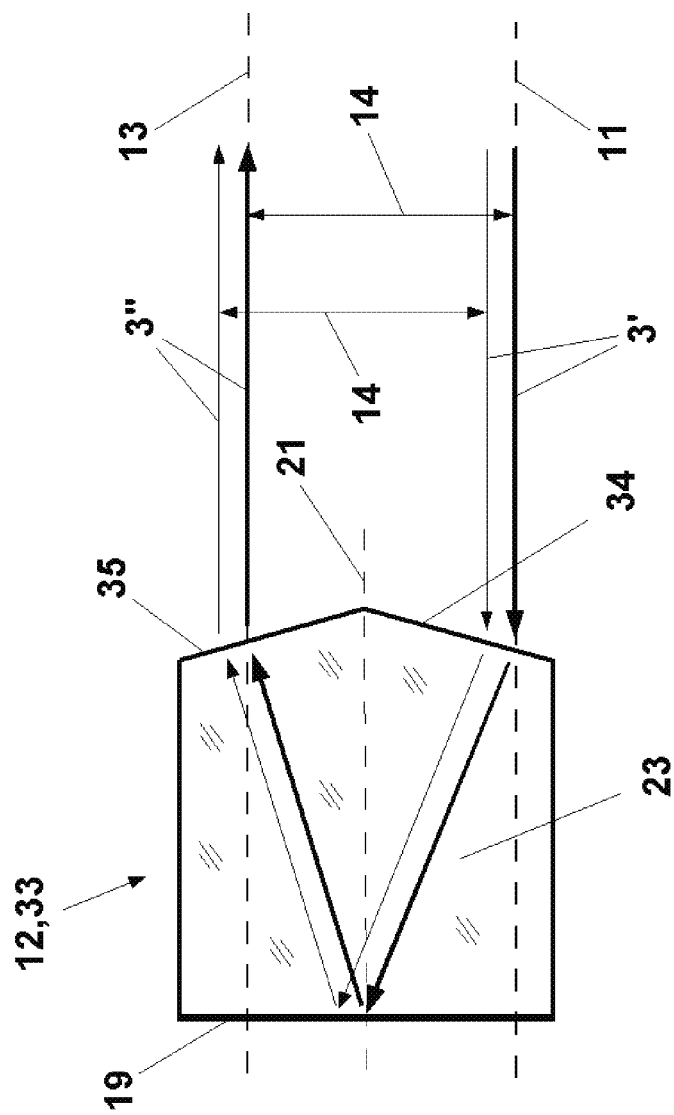
FIG. 6 shows the second reflector in a third embodiment.

The embodiment represented in FIG. 6 is an additional prism 33. At the inlet in the prism 33, the light beam 3 is deflected by a refractive planar surface 34, before it is reflected by the reflecting planar surface 19 oriented orthogonally relative to the optical axes 11 and 13. When the light beam 3 exits the prism 33 again, it is deflected by an additional refractive planar surface 35 in such a way that the light beam 3″ reflected by the second reflector 12 extends parallel to the incident light beam 3′. Here, the two refractive optical surfaces 34 and 35 directly adjoin one another. In this way, the area normal to the optical axis 11, in which the light beam 3′ can strike the reflector 12, is particularly large.

Figure 7:
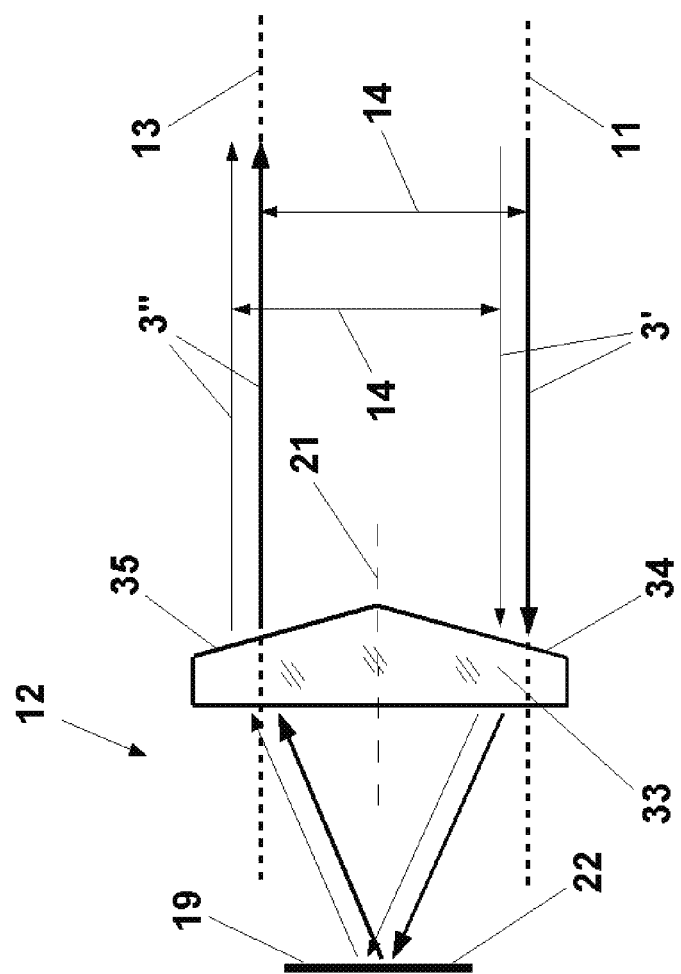
FIG. 7 shows the second reflector in a fourth embodiment which is equally effective as the embodiment according to FIG. 6.

FIG. 7 shows a reflector 12 equivalent to the reflector 12 according to FIG. 6, in which the planar surface 19 reflecting the light beam 3 is formed on a planar mirror 22 which is separated from the prism 33 in the direction of the optical axes 11 and 13.

Figure 8:
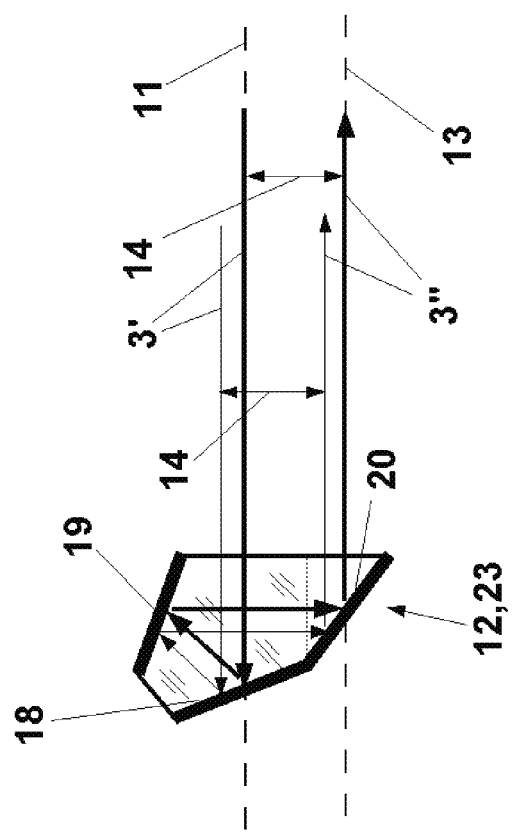
FIG. 8 shows the second reflector in a fifth embodiment.

The embodiment of the reflector 12 shown in FIG. 8 is an additional prism 23. Just like on the prism 17 according to FIG. 4, on the prism 23 three planar surfaces 18 to 20 are formed, which reflect the light beam 3 one after the other. The planar surface 20 is here oriented at an angle of 45° relative to the optical axes 11 and 13 and deflects the light beam 3 by 90°. The other two planar surfaces 18 and 19 together also deflect the light beam 3 by 90°. Overall, here too, independently of the precise spatial orientation of the second optical axis 11 on which the light beam 3′ is incident, the reflected light beam 3″ always has a parallel offset from the incident light beam 3′ in the same transverse direction by the same fixed amount 14.

Figure 9:
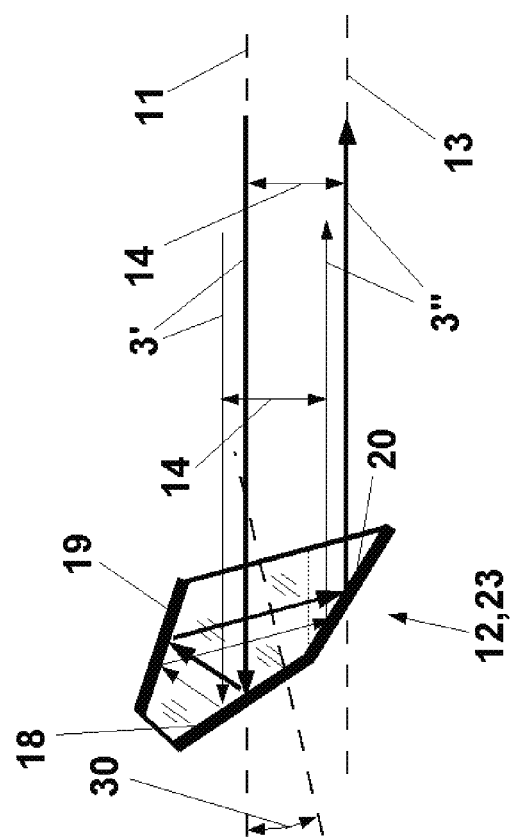
FIG. 9 shows the second reflector in a fifth embodiment after rotation with respect to FIG. 8.

FIG. 9 illustrates that a pivoting of the prism 23 according to FIG. 8 does not change the fixed amount 14 of the parallel offset between the incident light beam 3′ and the light beam 3″ reflected by the reflector 12. Even in cases in which the prism 23 is shifted parallel and perpendicularly to the plane of the drawing of FIG. 9, the fixed amount 14 remains fixed. However, rotations of the prism 13 about the optical axes 11 and 13 change the direction of the parallel offset with the fixed amount 14 and are therefore not admissible. This means that, after the setting has been carried out, the reflector 12 has to be fastened to the mechanical structure 5 of the light source 2 according to FIGS. 1 to 3 in an unmovable manner at least with respect to rotations about the optical axes 11 and 13 and the first optical axis 4 parallel thereto.

Figure 10:
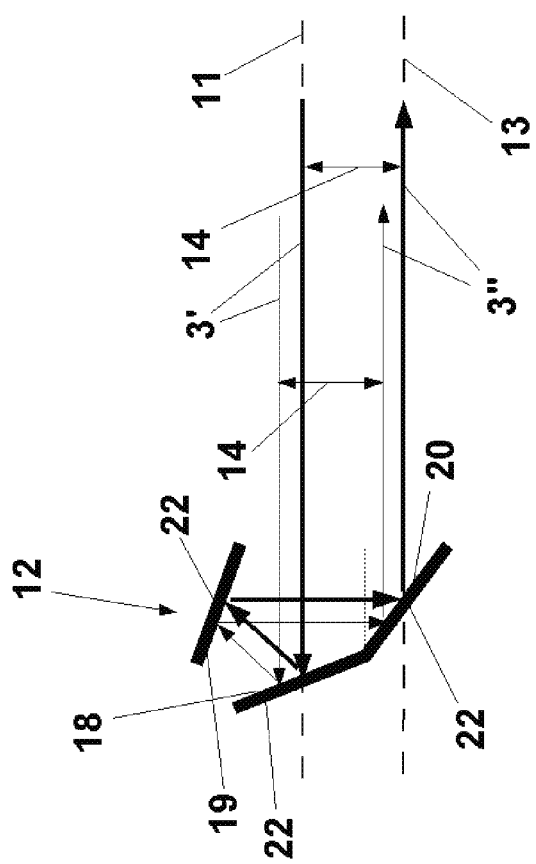
FIG. 10 shows the second reflector in a sixth embodiment which is equally effective as the embodiment according to FIGS. 8 and 9.

FIG. 10 shows an embodiment of the reflector 12, which is equivalent to the embodiment according to FIGS. 8 and 9 but constructed from planar mirrors 22.

Figure 11:
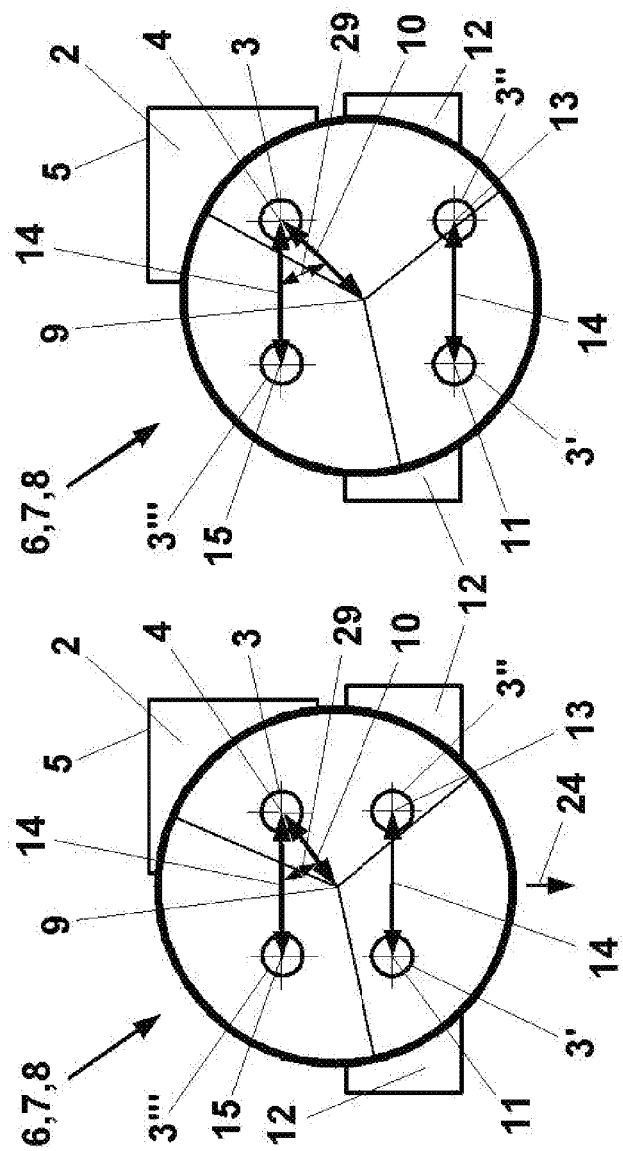
FIGS. 11(*a*) and 11(*b*) illustrates the effect of a displacement of a first reflector, designed as a retroreflector, of the optical arrangement according to the invention according to FIG. 3 in vertical direction.

FIG. 11 (*a*) shows the optical arrangement 1 according to FIGS. 1 to 3 in the same viewing direction as FIG. 3. Here, an arrow 24 in FIG. 8 (*a*) denotes a shift of the retroreflector 7 downward, which is implemented in FIG. 11 (*b*). Thereby, the second optical axis 11 is in fact displaced and thus the third optical axis 13 is also displaced further downward.

However, since the fourth optical axis 15 is accordingly shifted further upward with respect to the second optical axis 11 and the third optical axis 13, the fourth optical axis 15 is again located at the same height as the first optical axis 4 and has a parallel offset from the first optical axis 4 with the same fixed amount 14 counter to the horizontal transverse direction, wherein the third optical axis 13 has a parallel offset from the second optical axis 11 with the fixed amount 14.

Figure 12:
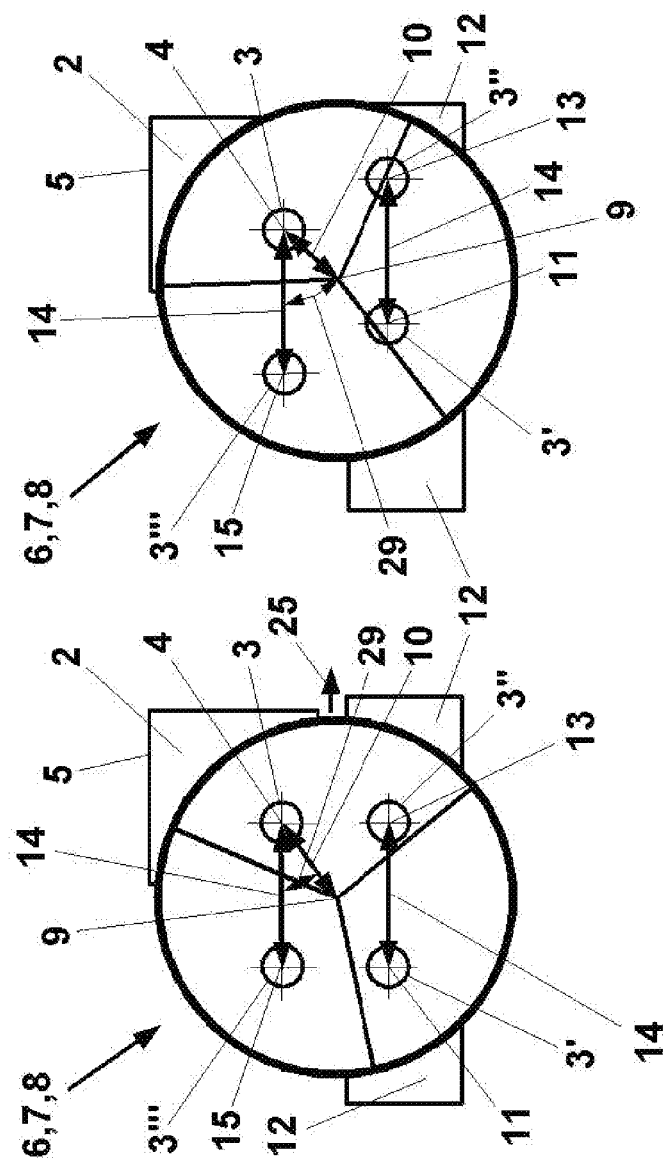
FIGS. 12(*a*) and 12(*b*) illustrates the effect of a displacement of the retroreflector according to FIG. 3 in horizontal direction.

FIGS. 12(a) and 12(b) accordingly shows the effects of a horizontal shifting of the retroreflector 7 to the right in the direction of an arrow 25 shown in the drawing in FIG. 9 (a). Thereby, the second optical axis 11 is also displaced to the right. However, this is compensated by the retroreflector 7 between the third optical axis 13 and the fourth optical axis 15 in such a way that here too the fourth optical axis 15 has a parallel offset from the first optical axis 4 with the same fixed amount 14 counter to the horizontal transverse direction, wherein the third optical axis 13 has a parallel offset from the second optical axis 11 with the fixed amount 14.

Figure 13:
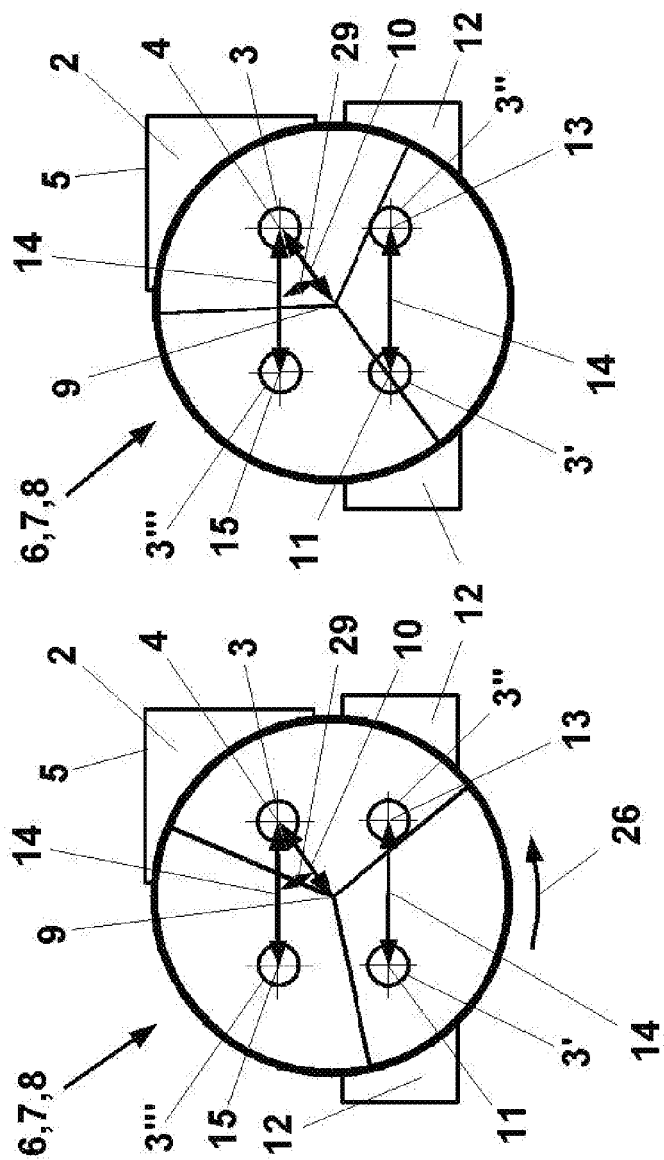
FIGS. 13(*a*) and 13(*b*) illustrates the effect of a rotation of the retroreflector about its main axis.

FIGS. 13(a) and 13(b) illustrates the effect of a rotation of the retroreflector 7 about its main axis 9 in the direction of a rotation arrow 26 shown in the drawing in FIG. 10 (a). This rotation has no effect on the spatial orientation of the second optical axis 11 with respect to the first optical axis 4.

Figure 14:
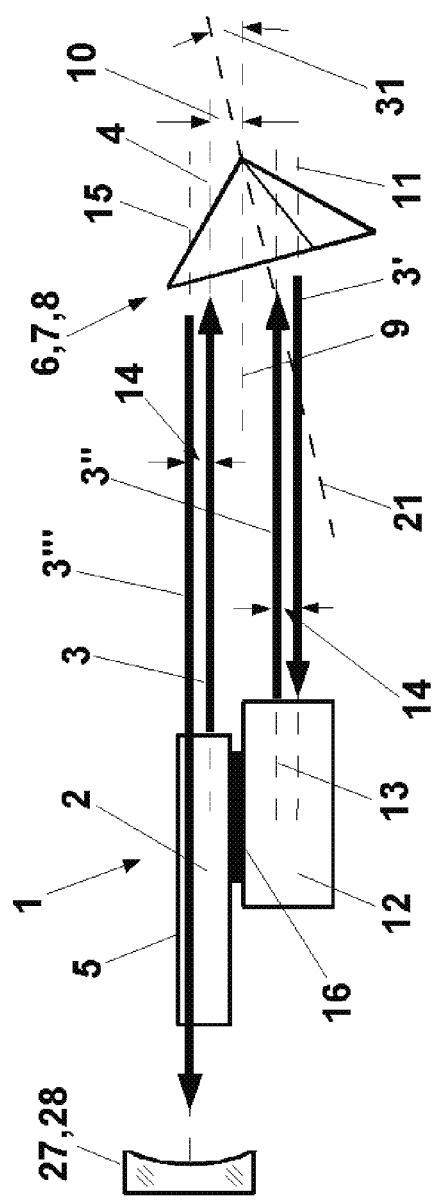
FIG. 14 illustrates the effect of a tilting of the main axis of the retroreflector.

FIG. 14 illustrates the effect of a tilting of the main axis 9 with respect to the first optical axis 4 by an angle 31. This angle 31 has an effect in the form of a change of the parallel offset between the two optical axes 4 and 11, which is however compensated accordingly by the parallel offset between the optical axes 13 and 15.

In summary, FIGS. 11(a) and 11(b) to 14 show that the position and orientation of the retroreflector 7 designed as triple prism 8 is irrelevant for the spatial orientation of the fourth optical axis 15 with respect to the first optical axis 4. By linear combination of the position and orientation changes represented individually in FIGS. 11(a) and 11(b) to 14, any desired position and orientation changes of the retroreflector can be represented.

Figure 15:
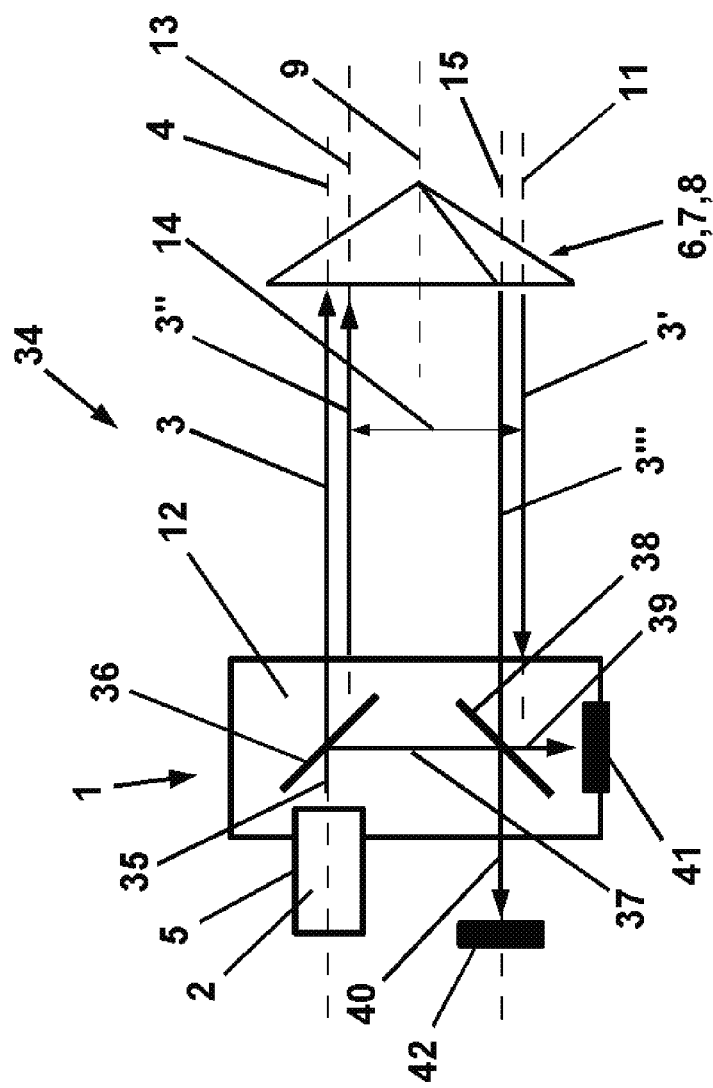
FIG. 15 is a view of a LASER interferometer according to the invention.

FIG. 15 shows a LASER interferometer 34 according to the invention with the optical arrangement 1 according to the invention. Here, a LASER beam 35 coming from the light source 2 is split with a beam splitter 36 into the light beam 3 and a light beam 37 coherent thereto. With the aid of an additional beam splitter 38, the light beam 3''' reflected along the fourth optical axis 15 by the first reflector 6 and the light beam 37 coherent thereto are superposed, wherein two complementary interference signals 39 and 40 are generated, which are acquired by two detectors 41 and 42. The beam splitters 38 are rigidly connected to the mechanical structure 5 of the light source 2. The detectors 41 and 42 can but do not have to be connected to the mechanical structure 5. With a change in the distance of the reflector 6 from the light source 2, the two complementary interference signals 39 and 40 change and thus allow an exact acquisition of changes of this distance. Other changes in the orientation of the position of the first reflector 6 are however compensated by the optical arrangement 1.

Figure 16:
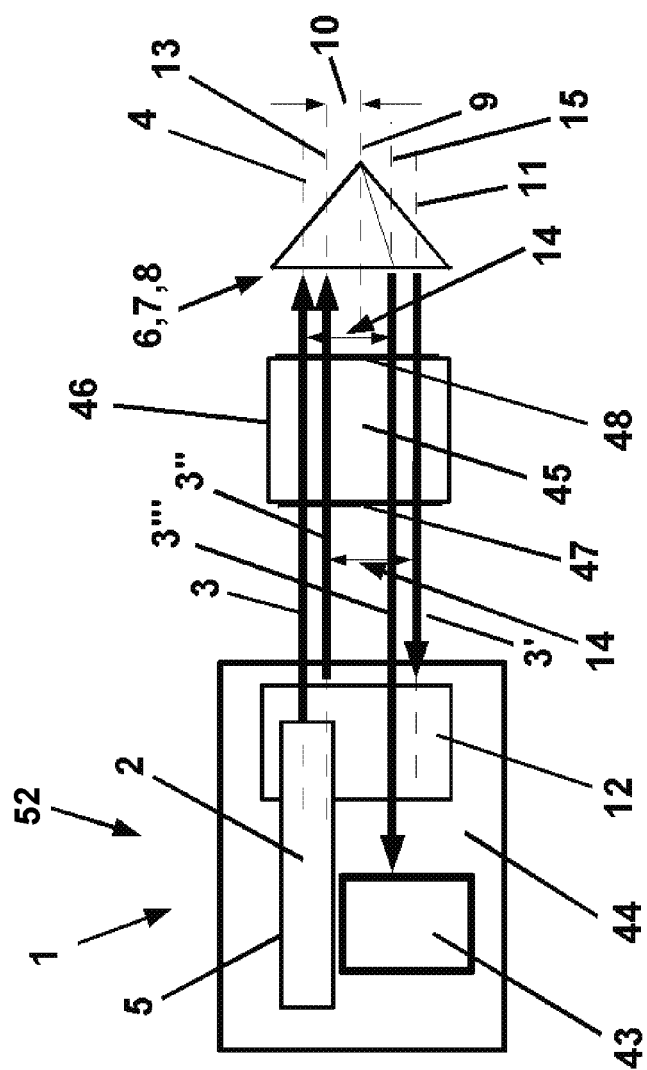
FIG. 16 is a view of a LASER spectrometer according to the invention.

FIG. 16 shows a LASER spectrometer 52 according to the invention, in which the light source 2, the reflector 12 and a detector 43 are arranged in a common housing 44 on one side of a measurement volume 45, while the first reflector 6 lies on the opposite side of the measurement volume 45. The measurement volume is here delimited by a wall 46. The light beam 3 enters the measurement volume 45 four times through window 47 and 48 and exits said measurement volume again, and finally reliably reaches the detector 43 which is fixed relative to the mechanical structure 5 of the light source 2, independently of the current position and orientation of the retroreflector 6.

Figure 17:
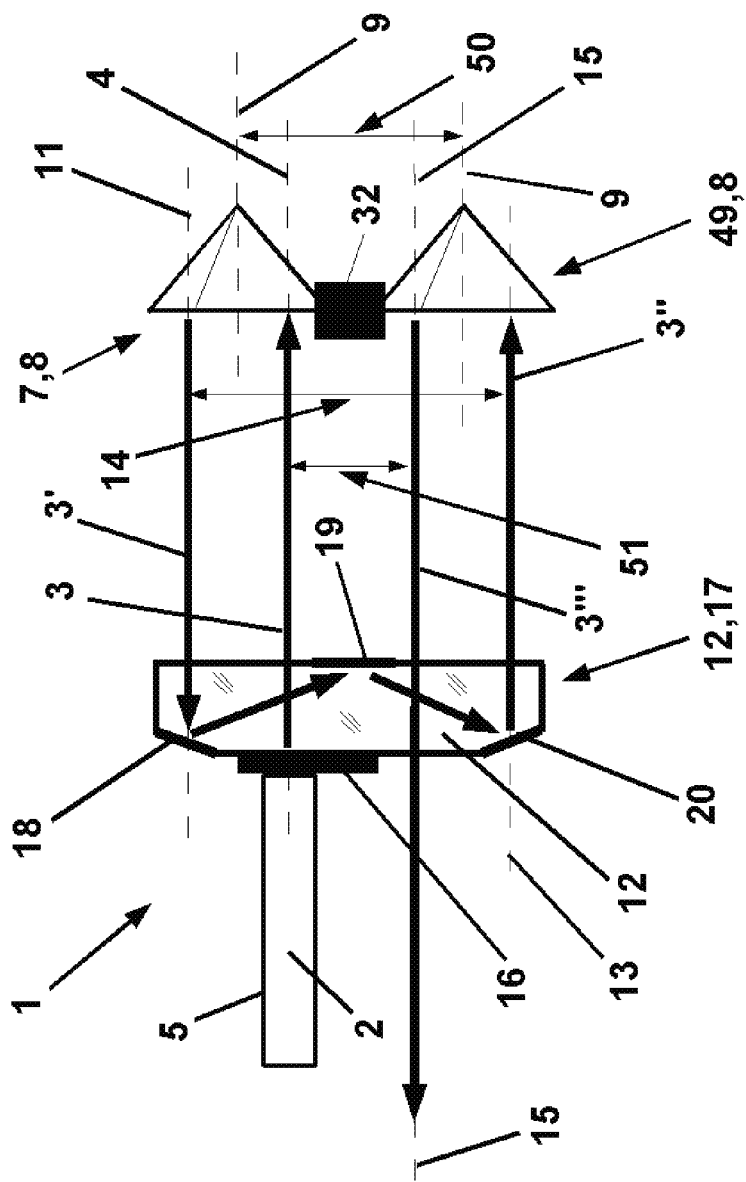
FIG. 17 is a side view of an alternative embodiment of the optical arrangement according to the invention.

FIG. 17 shows an alternative embodiment of the optical arrangement 1, in which the light beam 3" reflected by the second reflector 12 in the form of a prism 17 as in FIG. 4 is not reflected again by the first reflector 6 but instead by a retroreflector 49 rigidly coupled thereto. To illustrate the rigid coupling of the two retroreflectors 7 and 49, a fastening 32 is shown in the drawing in FIG. 17. The retroreflector 49 is also designed as a triple prism and here, in particular, concretely exactly like the first reflector 6. The two retroreflectors 7 and 49 are arranged at a fixed distance 50 transversely relative to the third optical axis 13. Since the main axes 9 of the two triple prisms 8 extend here parallel to one another, the fixed distance 50 here also exists between the main axes of the two retroreflectors 7 and 49. The fixed distance 50 has a fixed angle with respect to the transverse offset with the fixed amount 14 between the second optical axis 11 and the third optical axis 13 or it extends parallel thereto. This means that the unit with the two retroreflectors 7 and 49 may not be rotated about one of the optical axes 4, 11, 13 and 15, since, in that case, the angle between the distance 15 and the transverse offset with the fixed amount 14 would then change. In this embodiment of the optical arrangement 1, the transverse offset between the first optical axis 4 and the fourth optical axis 15 in addition comprises in fact an additional fixed amount 51. However, this additional fixed amount 51 is only equal to the fixed amount 14 if the distance 50 times the cosine of any angle present between the fixed distance 50 and the transverse offset with the same amount 14 is equal to the fixed amount 14. In addition, the transverse offset with the additional fixed amount 51 extends precisely in the direction of the transverse offset with the fixed amount 14 only if the fixed distance 15 and the transverse offset with the fixed amount 14 extend parallel to one another. In this alternative embodiment of the optical arrangement 1, in contrast to the embodiment according to the preceding figures, the transverse offset between the first optical axis 4 and the fourth optical axis 15 in addition has the same direction as the transverse offset between the second optical axis 11 and the third optical axis 13. An additional special feature is that the light beam 3 coming from the light source 2 here also passes through the prism 17.

REFERENCE SIGNS LIST

1 Optical arrangement
2 Light source
3 Light beam
3' Reflected light beam
3" Reflected light beam
3''' Reflected light beam
4 First optical axis
5 Mechanical structure of the light source
6 First reflector
7 Retroreflector
8 Triple prism
9 Main axis
10 Amount
11 Second optical axis
12 Second reflector
13 Third optical axis
14 Fixed amount
15 Fourth optical axis
16 Fastening
17 Prism 18 Planar surface
19 Planar surface
20 Planar surface
21 Surface normal
22 Planar mirror
23 Prism
24 Arrow
25 Arrow
26 Rotation arrow
27 Third reflector
28 Convex mirror
29 Angle
30 Angle
31 Angle
32 Fastening
33 Prism
34 LASER interferometer
35 LASER beam
36 Beam splitter
37 Coherent light beam
38 Beam splitter
39 Interference signal
40 Interference signal
41 Detector
42 Detector
43 Detector
44 Housing
45 Measurement volume
46 Wall
47 Window
48 Window
49 Coupled retroreflector
50 Spacing
51 Additional fixed amount
52 LASER spectrometer

The invention claimed is:

1. An optical arrangement comprising:
a light source, for emitting a light beam in a direction of a first optical axis, wherein a spatial orientation of the first optical axis is defined in relation to a mechanical structure of the light source;
a first reflector for the light beam arranged at a distance from the light source; and
a second reflector arranged for reflecting the light beam when reflected by the first reflector;
wherein the first reflector is a retroreflector, which is arranged with a transverse offset from the first optical axis in such a way that it is arranged to reflect the light beam in a direction of a second optical axis, which has a parallel offset in relation to the first optical axis in a transverse direction of the transverse offset; and
wherein the second reflector, which is fastened to the mechanical structure of the light source is arranged to reflect the light beam when reflected by the first reflector in a direction of a third optical axis, which has a parallel offset from the second optical axis with a fixed amount in a fixed transverse direction, whereby the light beam will be reflected as follows:
either back to the first reflector in such a way that the light beam will be reflected by the first reflector in a direction of a fourth optical axis which has a parallel offset in relation to the first optical axis with the fixed amount counter to the fixed transverse direction, or
to an additional retroreflector which is rigidly coupled to the first reflector and oriented in such a way that the light beam will be reflected by an additional retroreflector in the direction of a fourth optical axis which has a parallel offset in relation to the first optical axis with an additional fixed amount in the fixed transverse direction wherein an angle between the transverse offset of the retroreflector from the first optical axis and the parallel offset of the fourth optical axis from the first optical axis counter to the fixed transverse direction is between 10° and 70°.

2. The optical arrangement according to claim 1, wherein the fixed amount is 1 to 3 times the transverse offset of the retroreflector multiplied by a cosine of the angle.

3. The optical arrangement according to claim 1, wherein the second reflector is a mirror arrangement or a prism with three planar surfaces for reflecting the light beam.

4. The optical arrangement according to claim 3, wherein one of the planar surfaces is oriented orthogonally with respect to the first optical axis, and the two other planar surfaces are arranged axially symmetrically with respect to a surface normal of the one planar surface, wherein surface normals of all three planar surfaces fall in one plane.

5. The optical arrangement according to claim 3, wherein one of the planar surfaces is arranged at an angle of 45° with respect to the first optical axis.

6. The optical arrangement according to claim 1, comprising:
a third reflector arranged for reflecting the light beam reflected again by the first reflector in the direction of the fourth optical axis, which is fastened to the mechanical structure of the light source.

7. The optical arrangement according to claim 6, wherein the third reflector is arranged to reflect in the direction of the fourth optical axis back to the first reflector.

8. The optical arrangement according to claim 7, wherein the third reflector is a planar mirror oriented orthogonally with respect to the first optical axis.

9. The optical arrangement according to claim 7, wherein the third reflector is a convex mirror curved around a center on the fourth optical axis.

10. The optical arrangement according to claim 1, wherein the first reflector and to an extent present also the additional retroreflector comprises:
a triple prism or a triple mirror.

11. The optical arrangement according to claim 1, wherein the light source comprises:
a LASER material, and the light beam is a LASER beam.

12. A LASER having
a LASER resonator; and
an optical arrangement according to claim 11, wherein:
the first reflector and the second reflector are parts of the LASER resonator; and
the LASER material of the light source is arranged in the LASER resonator.

13. A LASER interferometer having an optical arrangement according to claim 11, wherein the light beam when reflected by the first reflector and by the second reflector will be superposed with a light beam which is coherent thereto, in an optical path of which exclusively optical elements fastened to the mechanical structure of the light source are arranged.

14. A LASER spectrometer having an optical arrangement according to claim 11, wherein the light source, the second reflector and a detector fastened to the mechanical structure of the light source are arranged on a first side, and the first reflector is arranged on a second side of a measurement volume facing the first side in such a way that the light beam when reflected by the first reflector and by the second reflector will pass at least four times through the measurement volume before it strikes the detector.

15. The optical arrangement according to claim 1, wherein an angle between the transverse offset of the retroreflector from the first optical axis and the parallel offset of the fourth optical axis from the first optical axis counter to the fixed transverse direction is between 20° and 50°.

16. The optical arrangement according to claim 1, wherein the fixed amount is 1.5 to 2.5 times the transverse offset of the retroreflector multiplied by a cosine of the angle.

* * * * *